United States Patent [19]

Bex, deceased et al.

[11] 4,414,343

[45] Nov. 8, 1983

[54] EPICHLOROHYDRIN-BASED FLEXIBLE ELASTOMER COMPOSITION

[76] Inventors: Guy Bex, deceased, late of Gradignan, France; by Josette Bex, legal representative, 135, Route de Canéjan, 33170 Gradignan, France; Yve Carsoule, Résidence du Parc du Chateau, Les Noyers "B", 33700 Mérignac, France

[21] Appl. No.: 443,429

[22] Filed: Nov. 22, 1982

[30] Foreign Application Priority Data

Nov. 20, 1981 [FR] France .............................. 81 21784

[51] Int. Cl.$^3$ .............................................. C08L 63/00
[52] U.S. Cl. .................................... 523/440; 523/455; 523/459; 523/461; 523/468
[58] Field of Search ............... 523/440, 442, 455, 459, 523/461, 400, 468; 528/419, 421

[56] References Cited

U.S. PATENT DOCUMENTS

| 4,069,174 | 1/1978 | Nakata et al. ........................ 528/421 |
| 4,072,734 | 2/1978 | Nakata et al. ........................ 528/421 |

FOREIGN PATENT DOCUMENTS

| 699008 | 12/1964 | Canada ................................. 523/440 |
| 1904348 | 9/1969 | Fed. Rep. of Germany . |
| 1350169 | 12/1963 | France . |
| 2193054 | 7/1973 | France . |
| 920470 | 3/1963 | United Kingdom ................ 523/400 |
| 1133562 | 11/1968 | United Kingdom ................ 523/461 |

OTHER PUBLICATIONS

K. F. Heinisch, "Kautschuk-Lexikon", ed. 2, 1977, A. W. Gentner Verlag Stuttgard (DE), pp. 430–437.

*Primary Examiner*—Ronald W. Griffin

[57] ABSTRACT

The present invention relates to an epichlorohydrin elastomer composition having an improved ageing resistance.

This composition comprises 100 parts by weight of epichlorohydrin homopolymer or copolymer, 0.5 to 20 parts by weight of a plasticizer such as stearic acid, 1 to 150 parts by weight of a reinforcing filler constituted by a slightly agglomerated, medium structure carbon black having an average particle size of 200 to 280 microns and 0.5 to 7.5 parts by weight of a first acid acceptor constituted e.g. by zinc or calcium stearate, 0.5 to 7.5 parts by weight of a second acid acceptor constituted e.g. by lead oxide $Pb_3O_4$, 0.5 to 5.5 parts by weight of at least one protection agent constituted by an organic compound with conjugated aromatic cycles containing amine or phenol functions and/or by an alkyl or aryl dithiocarbamate metal salt and 0.5 to 5.5 parts by weight of a vulcanizing agent preferably constituted by hexamethylene diamine carbamate.

Application of the composition to the production of moulding bags able to withstand a pressure of 2000 bar and a temperature of 140° C. in the presence of oil.

15 Claims, No Drawings

EPICHLOROHYDRIN-BASED FLEXIBLE ELASTOMER COMPOSITION

BACKGROUND OF THE INVENTION

The present invention relates to a epichlorohydrin-based flexible elastomer composition.

More specifically, it relates to elastomer compositions based on epichlorohydrin homopolymer or copolymer and ethylene oxide having improved properties compared with the presently known elastomers of this type, particularly with respect to their resistance to pressurized hydraulic fluids at temperatures exceeding 120° C.

It is known that epichlorohydrin-based elastomers have excellent chemical and physical properties, and in particular a resistance to hydraulic fluids better than that of elastomers which are considered to be resistant thereto, such as nitrile rubbers, acrylic rubbers and neoprenes, a resistance to ozone equivalent to that of the best of the three aforementioned elastomers and an excellent heat resistance.

However, the presently known epichlorohydrin-based elastomer compositions do not make it possible to obtain elastomers which, at temperatures above 120° C., have elastic properties and a resistance to tearing which are completely satisfactory, or particularly when they have to be used in the presence of oil.

The presently known elastomer compositions generally comprise an epichlorohydrin homopolymer or copolymer, a reinforcing filler constituted by carbon black, acid acceptors such as zinc stearate and minium, a protection agent such as nickel dibutyl dithiocarbamate, whilst they are vulcanized at about 150° C. by vulcanizing agents such as thiourea derivatives.

Such compositions have the disadvantage of containing toxic constituents, such as lead and thiourea derivatives, whilst they are also difficult to handle because they stick to the roller during rolling. Moreover, they corrode the moulds during press vulcanization.

BRIEF SUMMARY OF THE INVENTION

The present invention relates to a epichlorohydrin-based flexible elastomer composition obviating the aforementioned disadvantages, which also has s good resistance to ionizing radiation and which is suitable for producing moulding bags with standing a pressure of 2000 bars and a temperature of 140° C. in the presence of oil, whilst still remaining flexible.

To this end, the elastomer composition according to the invention comprises:

100 parts by weight of epichlorohydrin homopolymer or copolymer, 0 to 20, preferably 1 to 10 parts by weight of a plasticizer 1 to 150, preferably 1 to 50 parts by weight of a reinforcing filler constituted by an only slightly agglomerated, medium structure carbon black with an average particle size of 200 to 280 microns, an iodine absorption index NFT45-111 of 115 to 127 mg/g, a dibutyl phthalate absorption index NFT45-122 of 108 to 120 cm$^3$/100 g and an apparent density NF45-151 of 295 to 395 kg/m$^3$, 0.5 to 7.5, preferably 1 to 4 parts by weight of a first acid acceptor constituted by a metal salt of a carboxylic acid having at least 8 carbon atoms, 0.5 to 7.5 parts by weight of a second acid acceptor, constituted by an oxide, a hydroxide or a metal salt, 0.5 to 5.5 parts by weight of at least one protection agent chosen from the group of organic compounds having conjugate aromatic cycles containing amine or phenol functions and alkyl or aryl dithiocarbamate metal salts, and 0.5 to 5.5, preferably 0.5 to 3 parts by weight of a vulcanizing agent.

Due to the presence in this composition of a carbon black having the aforementioned characteristics, it is possible to improve the resistance to tearing of the elastomer and its ageing resistance is improved, whilst retaining the flexibility, e.g. a low tensile stress at 300% elongation, even after ageing in air or in different aliphatic oils at temperatures of 140° C. or higher.

Suitable carbon blacks are ISAF blacks classified in accordance with ASTM D 2516 and AFNOR NFT 45 103 standards in series N 200 to N 300. These furnace blacks have a good resistance to abrasion and tearing, as well as a relatively high structural index. They have the characteristics defined hereinbefore and can be used in the elastomer composition according to the invention.

Compared with the use of a type HAF black, such blacks have a variation with IRB No. 4 on the 300% elongation stress of −0.52 to −0.72 MPa after 15 minutes of vulcanization and −0.63 to −0.83 MPA after 30 minutes of vulcanization.

According to the invention, the epichlorohydrin copolymer which can be used is the copolymer of epichlorohydrin and ethylene oxide.

According to an advantageous feature of the elastomer composition according to the invention, the vulcanization agent is constituted either by an aliphatic, alicyclic or aromatic polyamine, or by a diamine carbamate.

Thus, although it is possible to use other vulcanizing agents, e.g. imidazolines or amino agents containing sulphur such as ethylene thiourea (2-mercaptoimidazoline) and 2,4,6-trimercapto-S-triazine, it has been found that the best results are obtained when using a polyamine or a diamine carbamate, such as hexmethylene diamine carbamate or ethylene diamine carbamate.

The use of these vulcanizing agents more particularly makes it possible to improve the air ageing resistance of the elastomers according to the invention. In addition, these agents do not have the toxicity of certain previously used products, such as thiourea derivatives.

According to another advantageous feature, the elastomer composition according to the invention comprises two protection agents constituted on the one hand by an organic compound having conjugate aromatic cycles containing amine or phenol functions and, on the other hand, an alkyl or aryl dithiocarbamate metal salt.

This in particular makes it possible to limit to a lower level the acid acceptor content of the elastomer composition. However, in most cases, lead oxide Pb$_3$O$_4$ is used, which is toxic, as the acid acceptor. The use of two protection agents is of particular interest for limiting toxicity problems. Moreover, it also makes it possible to improve the ageing resistance of the elastomers.

The function of these protection agents is to prevent the action of oxygen, ozone or light, which in most cases leads to a deterioration of the elastomer and to the formation of cracks.

It is normal practice to use alkyl dithiocarbamate metal salts, amino compounds or phenol derivatives.

Amino compounds which can be used are N-isopropyl-N'-phenyl-p-phenylenediamine (IPPD), N-(1,3-dimethyl butyl)-N'-phenyl-p-phenylenediamine, bis(alpha,alpha-dimethylbenzyl)-4,4'-diphenylamine (DPPD), octyl diphenylamine and polymerized 2,2,4-trimethyl-1,2-dihydroquinoline.

Phenyl derivatives which can be used are bis-dimethyl-4,6-phenol methylene and 2,2'bis-(1-methylcyclohexyl)-6-phenol-4-methyl.

According to the invention, when using two protection agents, it is advantageous to use as the first protection agent an alkyl or aryl dithiocarbamate metal salt of formula:

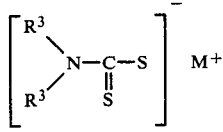

in which $R^3$ is an alkyl or aryl radical and M is a metal chosen from the group including sodium, potassium, bismuth, cadmium, copper, nickel, lead, selenium, tellurium and zinc.

For example, the radical $R^3$ can be a methyl, ethyl, propyl, butyl or benzyl group. Preferably, this protection agent is nickel dibutyl dithiocarbamate (NBC).

When two protection agents are used, the second protection agent is advantageously chosen from among the following compounds:

N-isopropyl-N'-phenyl-p-phenylene diamine (IPPD),
bis-(alpha,alpha-dimethyl benzyl)-4,4'-diphenylamine (DPPD),
the product known under the trade mark PERMANAX WSP, i.e. 2,2'-dihydroxy-di-(1-methylcyclohexyl)-3,3'-dimethyl-5,5'-diphenyl methane,
polymerized 2,2,6-trimethyl-1,2-dihydroquinoline (Flectol H).

The elastomer composition according to the invention generally incorporates a plasticizer. Plasticizers which can be used are compounds of formula:

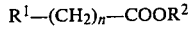

in which $R^1$ is an alkyl group, $R^2$ a hydroxylated alkyl group derived from an aliphatic polyalcohol or a hydrogen atom and n is an integer higher than 7, or compounds of formula:

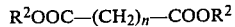

in which $R^2$ is a hydroxylated alkyl group derived from an aliphatic polyalcohol or a hydrogen atom and n is an integer higher than 7.

In general, the radicals $R^1$ and $R^2$ have 0 to 8 carbon atoms. For example, the radicals $R^1$ which can be used are methyl, ethyl and similar radicals. Radicals $R^2$ which can be used are radicals derived from glycerol, pentaerythritol, sorbitol, etc.

Preferably, the plasticizer used is stearic acid which in particular has the advantage of solubilizing lead oxide $Pb_3O_4$ on using the latter as the acid acceptor and facilitating the preparation of the elastomer composition.

Finally, the composition according to the invention also comprises first and second acid acceptors, which have the function of collecting the hydrochloric acid given off during the vulcanization reaction and which is prejudicial because it makes the moulds dirty.

It is possible to use for this purpose oxides, carbonates, carboxylic acid salts or metal phosphates of groups II and IV of the periodic classification of elements.

According to the invention, preference is given to the use as the first acid acceptor of a carboxylic acid salt of a metal of group II or IV such as zinc, calcium, lead or magnesium stearate, whilst the second acid acceptor is an oxide or hydroxide of calcium, magnesium, zinc or lead, preferably minium, i.e. lead oxide $Pb_3O_4$. In general, the weight ratio between the first and second acid acceptors is 1:15 to 15:1.

According to a preferred embodiment of the invention, the elastomer composition comprises:

100 parts by weight of a epichlorohydrin homopolymer, 1 to 10 parts by weight of stearic acid, 1 to 50 parts by weight of a reinforcing filler constituted by slightly agglomerated, medium structure carbon black with and average particle size of 200 to 280 microns, an iodine absorption index NF45-11 of 115 to 127 mg/g, a dibutyl phthalate absorption index NFT45-122 of 108 to 120 cm$^3$/100 g and an apparent density NFT45-151 of 295 to 395 kg/m$^3$, 1 to 4 parts by weight of zinc, calcium or magnesium stearate, 0.5 to 7.5 parts by weight of lead oxide $Pb_3O_4$, 0.5 to 5.5 parts by weight in all of a first protection agent constituted by nickel dibutyl dithiocarbamate and a second protection agent chosen from among N-isopropyl-N'-phenyl-p-phenylene diamine (IPPD), bis-(alpha,alpha-dimethylbenzyl)4,4'-diphenylamine (DPPD), polymerized 2,2,4-trimethyl-1,2-dihydroquinoline (Flectol H) and 2,2'-dihydroxy-di-(1-methylcyclohexyl)-3,3'-dimethyl-5,5'-diphenyl methane (Permanax WSP), and 0.5 to 3 parts by weight of a vulcanizing agent constituted by hexamethylene diamine carbamate.

The elastomer compositions according to the invention can be brought into the form of sheets or the like by conventional processes used in the rubber field.

In general, the epichlorohydrin homopolymer or copolymer is mixed with the plasticizer, the two acid acceptors, the protection agent or agents, followed by the addition of the carbon black and the vulcanizing agent. The mixture is then brought into the desired form, e.g. sheet form before vulcanization by heating at temperatures of approximately 160° C.

DESCRIPTION OF PREFERRED EMBODIMENTS

Other features and advantages of the invention will become apparent from reading the following examples given in an illustrative and non-limitative manner.

EXAMPLE 1

An epichlorohydrin homopolymer sold by the firm Goodrich under the trade mark HYDRIN 100 and having an intrinsic viscosity of 1.4 dl/g is mixed, using a roller mixer, whose rear roller rotates at 30 evolutions per minute and whose front roller rotates at 22 revolutions per minute, the temperature of the rollers being +50° C.

After two minutes of mixing, quarter the quantity of plasticizer constituted by stearic acid is introduced, and then simultaneously the first acid acceptor constituted by zinc stearate, the second acid acceptor constituted by minium and the two protection agents constituted respectively by N-isopropyl-N'-phenyl-p-phenylene diamine (IPPD) and nickel dibutyl dithiocarbamate (NBC).

This is followed by the addition of small fractions of carbon black in the form of the product sold under the trade mark ISAF N 220, mixed with the remainder of the stearic acid. This is followed by the vulcanization agent in the form of hexamethylene diamine carbamate marketed by Dupont de Nemours under the trade mark DIAK No. 1, followed by the three passages to completion.

Sheets are then prepared from the resulting elastomer composition and they undergo vulcanization for 40 minutes at 160° C.

The tensile and Shore A hardness properties are then determined on the basis of tensile tests according to AFNOR NFT 46.002. standards.

This is followed by accelerated ageing tests in air at a temperature of 140° C. for 24 h and then at 140° C. for 24 h in an aliphatic synthetic oil Ref. 1 of MOBIL.

After ageing in air and then ageing in air and oil, the tensile and Shore A hardness properties are determined under the same conditions as hereinbefore in order to check the properties of the sheets after ageing.

The product quantities used and the results obtained are given in Table 1.

EXAMPLE 2

The same procedure is adopted as in example 1, using the same constituents and the same quantities, but by replacing 2.5 parts of IPPD by 2.5 parts of bis-(alpha,alpha-dimethyl-benzyl)-4,4'-diphenylamine (DPPD).

The sheets obtained undergo tensile and hardness tests under the same conditions as in example 1 and the results are given in Table 1.

EXAMPLE 3

The procedure of example 1 is used, using the same constituents and the same quantities, but replacing 2.5 parts of IPPD by 2.5 parts of 2,2'-dihydroxy-di-(1-methyl-cyclohexyl)-3,3'-dimethyl-5,5'-diphenyl methane (PERMANAX WSP).

The tensile and Shore hardness properties are determined under the same conditions as in example 1.

EXAMPLE 4

The procedure of example 1 is used, employing the same constituents and quantities, except with regards to the stearic acid, the zinc stearate and the carbon blacks. The tensile and Shore hardness properties are determined under the same conditions as in example 1 and the results are given in Table 1.

Comparative Example 5

The procedure of example 1 is adopted, but stearic acid and IPPD are not used. Moreover, the minium and carbon black proportions are changed and the vulcanizing agent Diak No. 1 is replaced by ethylene thiourea, which is a product marketed under trade mark NA 22 by Dupont de Nemours. The tensile and hardness properties are also determined. The results obtained are given in Table 1.

Comparative Examples 6 and 7

The procedure of example 1 is used, but ISAF (N220) carbon blacks are replaced by FEFN 550 black which is a low structure black (550 micron particles), which is more agglomerated than ISAF (N220) black and less reinforcing in comparative example 6 and HAFN 375 black, which is intermediate between ISAF black and FEFN black in comparative example 7. In addition, certain constituents are modified and the quantities given in Table 1 are used. In addition, the tensile and Shore A hardness properties are determined under the same conditions as in example 1. The results obtained are given in Table 1.

This table shows through a comparison of the results obtained in example 4 and comparative example 7 that the presence of ISAF black makes it possible to improve the elastic properties of the elastomer after ageing in air and in oil for 24 hours at 140° C.

Moreover, by comparing the results obtained in examples 1 and 5, it can be seen that the choice of the vulcanizing agent and through the simultaneous use of minium and IPPD it is possible to improve the elastic properties of the elastomer after ageing in air and in oil.

Finally, it should be noted that the compositions obtained in comparative examples 5 and 6 are difficult to mix and tend to stick to the rear roller of the mixer.

EXAMPLES 8 to 12

The same conditions as in example 1 are employed, but using the constituents and quantities given in Table 2. The sheets obtained undergo the same tensile and hardness tests before and after ageing. The results obtained are given in Table 2.

Comparative Examples 13 to 15

The procedure of example 1 is adopted, but the quantities and constituents given in Table 2 are used.

The sheets obtained undergo tensile and hardness tests before and after ageing, as in example 1. The results obtained are given in Table 2.

The results of Table 2 also confirm that:

the use of a carbon black other than ISAF black does not make it possible to obtain satisfactory elastic properties after ageing in air and in oil (cf examples 13 and 14);

the use of a second protection agent constituted by IPPD or Flectol H makes it possible to obtain satisfactory elastic properties by using a smaller minium quantity (compare the results of example 11 and those of examples 8 to 10);

the use of polyamine such as Diak No. 1 and the vulcanizing agent makes it possible to obtain improved results (compare the results obtained in examples 10 and 12).

TABLE 1

| | Composition (parts by weight) | Examples | | | | Comparative examples | | |
|---|---|---|---|---|---|---|---|---|
| | | 1 | 2 | 3 | 4 | 5 | 6 | 7 |
| | Epichlorohydrin homopolymer (Hydrin 100) | 100 | 100 | 100 | 100 | 100 | 100 | 100 |
| Plasticizer | Stearic acid | 4 | 4 | 4 | 2 | | | 1 |
| First acid acceptor | Zinc stearate | 1 | 1 | 1 | 2 | 1 | 1 | 1 |
| | Retarder F (phthalic anhydride) | | | | | | 1 | |
| Second acid acceptor | Minium | 2.5 | 2.5 | 2.5 | 2.5 | 7.5 | | 2.5 |
| | IPPD(1) | 2.5 | | | 2.5 | | 5 | 2.5 |
| Protection | DPPD(2) | | 2.5 | | | | | |

TABLE 1-continued

| | Composition | Examples | | | | Comparative examples | | |
|---|---|---|---|---|---|---|---|---|
| | (parts by weight) | 1 | 2 | 3 | 4 | 5 | 6 | 7 |
| agent | Permanax WSP[3] | | | 2.5 | | | | |
| | NBC[4] | 1 | 1 | 1 | 1 | 1 | 1 | 1 |
| Vulcanizing | NA 22[5] | | | | | 1.5 | 1.5 | |
| agent | Diak No. 1[6] | 0.75 | 0.75 | 0.75 | 0.75 | | | 0.75 |
| | FEFN Noir 550 | | | | | | | 50 |
| Filler | HAFN Noir 375 | | | | | | 40 | |
| | ISAF Noir N220 | 30 | 30 | 30 | 40 | 40 | | |
| Mechanical properties | | | | | | | | |
| As it is | Tensile strength (MPA) | 18.7 | 15.3 | 15.7 | 15.3 | 21.7 | 10.1 | 9.5 |
| | 300% elongation stress (MPa) | 6 | 5.3 | 5.7 | 9.4 | 13.4 | 3.2 | 9.2 |
| | Elongation at break (%) | 900 | 905 | 810 | 610 | 530 | 1040 | 397 |
| | Shore A hardness | 61 | 57 | 59 | 72 | 69 | 54 | 74 |
| Ageing in air 24 h at 140° C. | Tensile strength (MPa) | 16.3 | 16.1 | 11.9 | 17.2 | 26.8 | 7.8 | 10.7 |
| | 300% elongation stress (MPa) | 7.6 | 7.1 | 6 | 14.1 | | | 10.7 |
| | Elongation at break (%) | 720 | 770 | 717 | 420 | 285 | 275 | 318 |
| | Shore A hardness | 64 | 61 | 62 | 80 | 79 | 75 | 75 |
| + ageing oil 25 h, 140° C. | Tensile strength (MPa) | 14.3 | 11.7 | 9.1 | 13.3 | 13.5 | 5.5 | 1.6 |
| | 300% elongation stress (MPa) | 9 | 6.3 | 5.6 | 12.9 | | | |
| | Elongation at break (%) | 500 | 623 | 571 | 325 | 110 | 60 | 0 |
| | Shore A hardness | 60 | 52 | 54 | 75 | 82 | 81 | 61 |

[1]IPPD: N—isopropyl-N'—phenyl-p-phenylene diamine.
[2]DPPD: bis-(alpha,alpha-dimethylbenzyl)-4,4'-dimethylamine.
[3]Permanax WSP: 2,2'-dihydroxy-di-(1-methyl-cyclohexyl)-3,3'-dimethyl-5,5'-diphenyl methane.
[4]NBC: Nickel dibutyl dithiocarbamate sold by E. I. Dupont de Nemours.
[5]NA 22: Ethylene thiourea.
[6]DIAK No. 1: Hexamethylene diamine carbamate.

TABLE 2

| | Composition | Examples | | | Comparative examples | | | |
|---|---|---|---|---|---|---|---|---|
| | (parts by weight) | 8 | 9 | 10 | 11 | 12 | 13 | 14 |
| | Epichlorohydrin homopolymer (Hydrin 100) | 100 | 100 | 100 | 100 | 100 | 100 | 100 |
| Plasticizer | Stearic acid | 2 | 2 | 2 | 2 | 2 | 2 | |
| First acid acceptor | Zinc stearate | 2 | | | | | | 1 |
| | Calcium stearate | | 2 | 2 | 2 | 2 | 2 | |
| Second acid acceptor | Minium | 2.5 | 2.5 | 2.5 | 5 | 2.5 | 2.5 | 5 |
| Protection agent | Permanax (IPPD) 115[1] | 2.5 | 2.5 | | | 2.5 | 2.5 | |
| | Flectol H[2] | | | 2.5 | | | | |
| | NBC[3] | 1 | 1 | 1 | 1 | 1 | 1 | 1 |
| Carbon black | ISAF Noir | 30 | 30 | 30 | 30 | 30 | | |
| | FEF Noir | | | | | | 30 | 30 |
| Vulcanizing agent | NA 22F[4] | | | | | 1.5 | 1.5 | 15. |
| | Dia No. 1[5] | 0.75 | 0.75 | 0.75 | 0.75 | | | |
| Mechanical properties | | | | | | | | |
| As it is | Tensile strength (MPa) | 17.7 | 18.9 | 17.8 | 18 | 19.8 | 13.2 | 12.7 |
| | 300% elongation stress (MPa) | 6.9 | 8.7 | 7.3 | 8.4 | 7.7 | 7 | 9.1 |
| | Elongation at break (%) | 811 | 711 | 787 | 714 | 796 | 728 | 505 |
| | Shore A hardness | 59 | 62 | 61 | 63 | 62 | 59 | 61 |
| Ageing in air 24 h 140° C. | Tensile strength (MPa) | 16.1 | 16.3 | 14.6 | 18.3 | 17.4 | 12.5 | 13.8 |
| | 300% elongation stress (MPa) | 8.4 | 10 | 9.2 | 11.5 | 15.7 | 6.1 | 13.4 |
| | Elongation at break (%) | 652 | 579 | 520 | 520 | 339 | 324 | 357 |
| | Shore A hardness | 60 | 59 | 62 | 65 | 65 | 55 | 50 |
| Ageing, air 24 h + 140° C. + oil 24 h + 140° C. | Tensiie strength (MPa) | 12.3 | 8.3 | 11.8 | 11.9 | 9.7 | 12.1 | 13.2 |
| | 300% elongation stress (MPa) | 8.8 | 6.6 | 9.8 | 8.8 | 7.1 | | |
| | Elongation at break (%) | 465 | 420 | 460 | 405 | 455 | 296 | 291 |
| | Shore A hardness | 60 | 55 | 50 | 55 | 60 | 65 | 50 |

[1]IPPD: N—isopropyl-N'—phenyl-p-phenylene diamine
[2]Flectol H: polymerized 2,2,6-trimethyl-1,2-dihydroquinoline.
[3]NBC: nickel dibutyl dithiocarbamate sold by E. I. Dupont de Nemours.
[4]NA 22F: ethylene thiourea
[5]Diak No. 1: hexamethylene diamine carbamate.

What is claimed is:

1. An elastomer composition which comprises:
   100 parts by weight of epichlorohydrin homopolymer or copolymer,
   0.5 to 20 parts by weight of a plasticizer,
   1 to 150 parts by weight of a reinforcing filler constituted by a slightly agglomerated, medium structure carbon black with an average particle size of 200 to 220 microns, an iodine absorption index of 115 to 127 mg/g, a dibutyl phthalate absorption index of 108 to 120 cm$^3$/100 g and an apparent density of 295 to 395 kg/m$^3$, 0.5 to 7.5 parts by weight of a first acid acceptor constituted by a metal salt of a carboxylic acid having at least 8 carbon atoms, 0.5 to 7.5 parts by weight of a second acid acceptor, constituted by an oxide, a hydroxide or a metal salt, 0.5 to 5.5 parts by weight of at least one protection agent chosen from the group of organic compounds with conjugate aromatic cycles containing amine or phenol functions and alkyl or aryl dithiocarbamate and 0.5 to 5.5 parts by weight of a vulcanizing agent.

2. A composition according to claim 1 which comprises:

100 parts by weight of epichlorohydrin homopolymer or copolymer, 1 to 10 parts by weight of a plasticizer, 1 to 50 parts by weight of the said carbon black, 1 to 4 parts by weight of the said first acid acceptor, 0.5 to 7.5 parts by weight of the said second acid acceptor, 0.5 to 5.5 parts by weight of the said protection agent or agents, and 0.5 to 3 parts by weight of a vulcanizing agent.

3. A composition according to claims 1 or 2, wherein the vulcanizing agent is constituted by an aliphatic, alicyclic or aromatic polyamine or a diamine carbamate.

4. A composition according to claim 3, wherein the vulcanizing agent is hexamethylene diamine carbamate.

5. A composition according to claims 1 or 2 which comprises two protection agents constituted on the one hand by an organic compound with conjugate aromatic cycles containing amine or phenol functions, and on the other hand by an alkyl or aryl dithiocarbamate metal salt.

6. A composition according to claims 1 or 2, wherein the plasticizer is in accordance with formula:

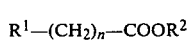
$$R^1-(CH_2)_n-COOR^2$$

in which $R^1$ is an alkyl group, $R^2$ a hydroxylated alkyl group derived from an aliphatic polyalcohol or a hydrogen atom and n is an integer exceeding 7.

7. A composition according to claims 1 or 2, wherein the plasticizer is in accordance with formula:

$$R^2OOC-(CH_2)_n-COOR^2$$

in which $R^2$ is a hydroxylated alkyl group derived from an aliphatic polyalcohol or a hydrogen atom and n is an integer exceeding 7.

8. A composition according to claim 6, wherein the plasticizer is stearic acid.

9. A composition according to claims 1 or 2, wherein the first acid acceptor is zinc, calcium, lead or magnesium stearate.

10. A composition according to claims 1 or 2, wherein the second acid acceptor is calcium, magnesium, zinc or lead oxide or hydroxide.

11. A composition according to claim 10, wherein the second acid acceptor is lead oxide $Pb_3O_4$.

12. A composition according to claims 1 or 2, wherein the protection agent is an alkyl or aryl dithiocarbamate metal salt of formula:

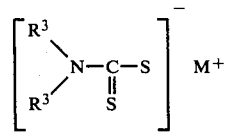

in which $R^3$ is an alkyl or aryl radical and M is a metal chosen from the group including sodium, potassium, bismuth, cadmium, copper, nickel, lead, selenium, tellurium and also zinc.

13. A composition according to claim 12, wherein the protection agent is nickel dibutyl dithiocarbamate.

14. A composition according to claims 1 or 2, wherein the protection agent is chosen from among N-iospropyl-N'-phenyl-p-phenylene diamine (IPPD), bis-(alpha,alpha-dimethylbenzyl)-4,4'-diphenylamine (DPPD), 2,2'-dihydroxy-di-(1, -methyl-cyclohexyl)-3,3'-dimethyl-5,4'-dimethylmethane (Permanax WSP) and polymerized 2,2,6-trimethyl-1,2-dihydroquinoline (Flectol H).

15. An elastomer composition according to claim 1 which comprises:

100 parts by weight of a epichlorohydrin homopolymer, 1 to 10 parts by weight of stearic acid, 1 to 50 parts by weight of reinforcing filler constituted by slightly agglomerated, medium structure carbon black with an average particle size of 200 to 280 microns, an iodine absorption index of 115 to 127 mg/g, a dibutyl phthalate absorption index of 108 to 120 $cm^3/100$ g and an apparent density of 295 to 395 $kg/m^3$, 1 to 4 parts by weight of zinc, calcium or magnesium stearate, 0.5 to 7.5 parts by weight of lead oxide $Pb_3O_4$, 0.5 to 5.5 parts by weight in all of a first protection agent constituted by nickel dibutyl dithiocarbamate and a second protection agent chosen from among N-isopropyl-N'-phenyl-p-phenylene diamine IIPPD), bis-(alpha,alpha-dimethylbenzyl)4,4'-diphenylamine (DPPD), polymerized 2,2,4-trimethyl-1,2-dihydroquinoline (Flectol H) and 2,2'-dihydroxy-di-(1-methyclyclohexyl)-3,3'-dimethyl-5,5'-diphenyl methane (Permanax WSP), and 0.5 to 3 parts by weight of vulcanizing agent constituted by hexamethylene diamine carbamate.

* * * * *